United States Patent
Boccalini, Jr. et al.

(10) Patent No.: US 10,309,536 B2
(45) Date of Patent: Jun. 4, 2019

(54) PISTON RINGS IN CAST TOOL STEELS AND PROCESS FOR THE MANUFACTURE THEREOF

(71) Applicants: Instituto De Pesquisas Tecnologicas Do Estado De Sao Paulo S/A, Sao Paulo (BR); Mahle Metal Leve S/A, Jundiai-Sp (BR); Mahle International GmbH, Stuttgart (DE)

(72) Inventors: Mario Boccalini, Jr., Sao Paulo (BR); Eduardo Albertin, Sao Paulo (BR); Moyses Leite De Lima, Sao Paulo (BR); Gisela Marques Araujo, Jundiai-Sp (BR)

(73) Assignees: Instituto De Pesquisas Technologicas Do Estado De Sao Paulo S/A (BR); Mahle Metal Leve S/A (BR); Mahle International GmbH (DE)

( * ) Notice: Subject to any disclaimer, the term of this patent is extended or adjusted under 35 U.S.C. 154(b) by 0 days.

(21) Appl. No.: 15/772,044

(22) PCT Filed: Oct. 24, 2016

(86) PCT No.: PCT/EP2016/075556
§ 371 (c)(1),
(2) Date: Apr. 27, 2018

(87) PCT Pub. No.: WO2017/072075
PCT Pub. Date: May 4, 2017

(65) Prior Publication Data
US 2018/0313447 A1 Nov. 1, 2018

(30) Foreign Application Priority Data
Oct. 29, 2015 (BR) .............. 102015027438

(51) Int. Cl.
*F16J 9/26* (2006.01)
*C23C 8/26* (2006.01)
(Continued)

(52) U.S. Cl.
CPC ............. *F16J 9/26* (2013.01); *C21D /18* (2013.01); *C21D 1/25* (2013.01); *C21D 1/74* (2013.01);
(Continued)

(58) Field of Classification Search
CPC ..... F16J 9/26; C21D 1/18; C21D 1/25; C21D 1/74; C21D 9/40; C21D 2211/004;
(Continued)

(56) References Cited

U.S. PATENT DOCUMENTS 6,200,528 B1 * 3/2001 Rodney .................. C22C 38/22
420/101
2004/0047757 A1 * 3/2004 Takayama ............. B32B 15/011
420/107

(Continued)

FOREIGN PATENT DOCUMENTS

GB 1482724 A 8/1977

*Primary Examiner* — Gilbert Y Lee
(74) *Attorney, Agent, or Firm* — Fishman Stewart PLLC

(57) ABSTRACT

A piston ring in cast tool steels including a ring of a tempered material having a chemical composition including a percent weight concentration of C from 0.80 to 1.40, Cr from 2.50 to 4.20, Mn from 0.10 to 1.00, Mo from 1.00 to 2.00, Nb from 2.50 to 4.50, P of no more than 0.05, S of no more than 0.05, Si from 0.10 to 1.00, Ti from 0.10 to 0.30, V from 1.00 to 3.00, W from 1.00 to 3.00, and a remaining concentration balance of Fe. The tempered material may have a microstructure including a matrix of tempered martensite with precipitation of at least one of secondary $M_2C$ carbides and MC carbides, M being at least one of V, Mo, Cr, and W. The microstructure may include NbC eutectic carbides having a cubic morphology. The tempered material (Continued)

(A)      (B)

may have a hardness from approximately 400 HV to 800 HV.

20 Claims, 4 Drawing Sheets

(51) Int. Cl.
| | |
|---|---|
| *C21D 9/40* | (2006.01) |
| *C23C 4/02* | (2006.01) |
| *C23C 8/02* | (2006.01) |
| *C21D 1/18* | (2006.01) |
| *C21D 1/25* | (2006.01) |
| *C22C 38/12* | (2006.01) |
| *C22C 38/18* | (2006.01) |
| *C22C 38/22* | (2006.01) |
| *C22C 38/24* | (2006.01) |
| *C22C 38/26* | (2006.01) |
| *C22C 38/28* | (2006.01) |
| *C21D 1/74* | (2006.01) |
| *C22C 1/02* | (2006.01) |

(52) U.S. Cl.
CPC .................. *C21D 9/40* (2013.01); *C22C 1/02* (2013.01); *C22C 38/12* (2013.01); *C22C 38/18* (2013.01); *C22C 38/22* (2013.01); *C22C 38/24* (2013.01); *C22C 38/26* (2013.01); *C22C 38/28* (2013.01); *C23C 4/02* (2013.01); *C23C 8/02* (2013.01); *C23C 8/26* (2013.01); *C21D 2211/004* (2013.01); *C21D 2211/008* (2013.01); *Y02P 10/212* (2015.11)

(58) Field of Classification Search
CPC ...... C21D 2211/008; C22C 1/02; C22C 38/12; C22C 38/18; C22C 38/22; C22C 38/24; C22C 38/26; C22C 38/28; C23C 4/02; C23C 8/02; C23C 8/26; Y02P 10/212
See application file for complete search history.

(56) References Cited

U.S. PATENT DOCUMENTS

2007/0187002 A1 8/2007 Takahashi et al.
2011/0305594 A1 12/2011 Pelsoeczy
2012/0090462 A1 4/2012 Pelsoeczy

* cited by examiner

PISTON RINGS IN CAST TOOL STEELS AND PROCESS FOR THE MANUFACTURE THEREOF

CROSS-REFERENCE TO RELATED APPLICATIONS

This application claims priority to International Patent Application No. PCT/EP2016/075556, filed on Oct. 24, 2016, and Brazilian Patent Application No. BR 10 2015 027438 6, filed on Oct. 29, 2015, the contents of both of which are hereby incorporated by reference in their entirety.

TECHNICAL FIELD

The present invention, belonging to the field of piston rings for internal combustion engines, relates to the obtainment of cast rings in tool steels containing niobium, chromium, molybdenum and vanadium, comprising the composition of the alloy and the process for the manufacture thereof.

BACKGROUND

In recent years, having the objective of minimizing the emission of harmful gases to the environment, and of particulate materials and/or other GHGs (greenhouse gases), a series of technologies has been incorporated into engines.

The reduction in emissions of gases is related, inter alia, to the increase in the thermal performance of the engine and, consequently, to the reduction in the specific consumption of fuel. As a consequence, engines are developing greater power per volume of displacement of the piston in the cylinder. The combustion engines are working under greater mechanical stresses, at higher rotation and higher combustion temperature. In this manner, the components thereof must be dimensioned to support these harsher operating conditions with the objective of ensuring both the reliability of the assembly and the maintenance of the working life expected. This greater operational stress is translated, likewise, into a greater stress experienced by the components, inter alia the piston and the rings associated with the piston.

With greater rates of compression, combustion pressure, temperature and rotation, the rings exert a greater pressure upon the piston and upon the cylinder walls, leading to greater wear and fatigue of the rings.

The aspects of wear and fatigue directly affect the durability of the piston rings, being connected to the maintenance of the performance of sealing and controlling the oil film within the design limits of the engine. These limits are related to emissions of pollutants, fuel consumption, and lubricating oil consumption, topics associated with public health. Furthermore, the lower fatigue strength may lead to the rupture of the ring and, consequently, to the seizure of the engine. In addition to the economic importance thereof, the seizure of the engine is a fundamental item in the safety of the vehicle.

The materials commonly utilized for the manufacture of piston rings are cast irons and high chromium martensitic steels. The process for the manufacture of the rings of cast iron may be summarized in the following stages: (1) melting of the alloy and correction of composition; (2) pouring into green sand molds or centrifugation; (3) heat treatment of the rings obtained; (4) machining to define the final dimensions; (5) treatments of surfaces such as nitridation or coatings to obtain a surface having high hardness. There is a technical limitation related to the mechanical strength for the utilization of rings of cast iron in engines having a high load or in engines requiring small cross sectional dimensions of the rings.

For the applications wherein the loads are high, the rings of cast iron are replaced by rings of high chromium martensitic steels. These are obtained by mechanical forming of drawn wires, for example as revealed in the document US 20070187002 ('Piston ring excellent in resistance to scuffing, cracking and fatigue resistances, and method for producing the same, and combination of piston ring and cylinder block'), and they pass through the stages (4) and (5) aforedescribed. Nevertheless, there are limitations on the dimensions of the rings which may be produced by this process of manufacture, in addition to technical disadvantages of geometric shape definition, demanding a more complex process of manufacture and finishing. In order to fulfil the diverse dimensions, there is a requirement of maintenance of a large stock of material, increasing the costs involved.

A relevant technical aspect connected with the process of obtainment of rings by mechanical forming of drawn wires of high chromium steel is the presence of microcracks arising from the decohesion between carbides and matrix caused by the accumulation of cross sectional reductions in the stages of rolling and drawing, notably in the regions of the microstructure wherein agglomeration of carbides occurs. These problems are resolved by rings of high chromium steels produced by casting processes similar to those utilized for the production of rings of cast iron.

In the case of the cast rings of high chromium steel, the microstructure of the material obtained, in conformity with the description of the document US 20120090462, presents coarse $M_7C_3$ eutectic carbides formed during the solidification. FIG. 1 shows the microstructure of a material obtained in conformity with the description of the example of embodiment of the document US 20120090462 in the states as-cast and following tempering (final stage of the development of the microstructure), it being possible to observe that the coarse $M_7C_3$ eutectic carbides precipitated in a continuous manner in the interdendritic regions do not change with the application of the cycles of heat treatment up to tempering. Continuous networks of eutectic carbides are preferential sites for the nucleation and the propagation of fatigue cracks and, consequently, the presence thereof implies prejudicing the performance of piston rings.

The realization of surface treatments to obtain high hardness, low wear coefficient with the liner, and high wear resistance is usual for piston rings. Nitridation is the process of treatment of surfaces commonly utilized on piston rings, being realized with gas, plasma or in a salt bath. Optionally, an anti-wear coating may be applied upon the face of contact with the cylinder utilizing materials and processes of deposition forming part of the state of the art.

BRIEF DESCRIPTION OF THE DRAWINGS

(FIG. 1B) of material produced according to the description of the example of embodiment of the document US 20120090462.

DETAILED DESCRIPTION

'PISTON RINGS IN CAST TOOL STEELS AND PROCESS FOR THE MANUFACTURE THEREOF' relates to cast piston rings of tool steel having high wear resistance and fatigue resistance, however more specifically it relates to cast piston rings of tool steel, the microstructure whereof is constituted by a tempered martensite matrix with precipitation of secondary $M_2C$ and/or MC carbides (M=V and/or Mo and/or Cr and/or W) having a typical size of between 0.5 µm and 2 µm, presenting high toughness, and by NbC eutectic carbides having cubic morphology, volumetric fraction between 1% and 4%, typical size of between 3 µm and 7 µm and homogeneous distribution, presenting high hardness in the band from 2500 to 3000 HV. Such microstructural characteristics confer high hardness, fatigue resistance and wear resistance on the cast piston rings of tool steel, rendering their performance in service superior to the piston rings manufactured with the representative materials of the current state of the art (cast irons and high chromium steels). Additionally, such microstructural characteristics permit the utilization of piston rings of tool steel lacking surface treatments, simplifying and rendering more economic the production process thereof.

The chemical compositions of the tool steel comprised in 'PISTON RINGS IN CAST TOOL STEELS AND PROCESS FOR THE MANUFACTURE THEREOF' are based on the concept of 'matrix steel', originally defined by G. A. Roberts (*Vanadium in high speed steel. Transactions of the Metallurgical Society of AIME*, v. 236, p. 950-63, 1966). This concept permits the obtainment of microstructures wherein a matrix of high toughness and eutectic carbides of high hardness are combined. In the case of the cast tool steel for piston rings according to the present invention, the quasi totality of the niobium combines with carbon according to the stoichiometric ratio represented by the molecular formula of the carbide NbC, by virtue of the fact that the solubility of the niobium in the austenite is less than 0.03% by weight.

Figure 1:
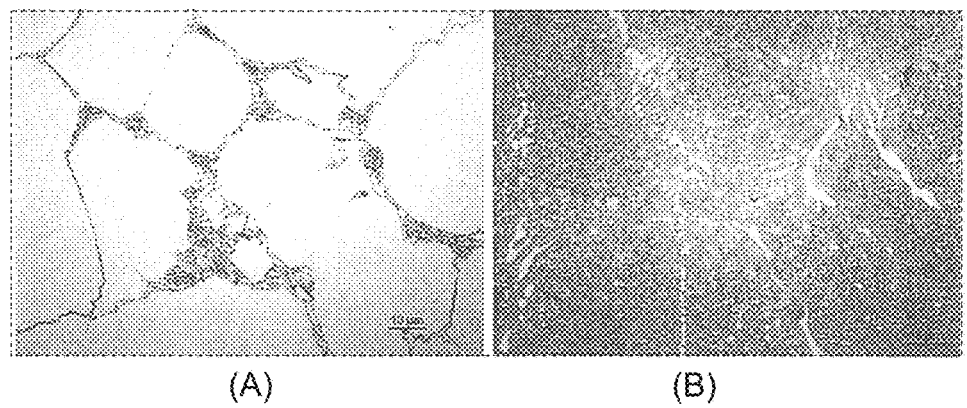
FIG. 1 shows the microstructure in the states as-cast (FIG. 1A) and following tempering at 600° C.
Figure 2:
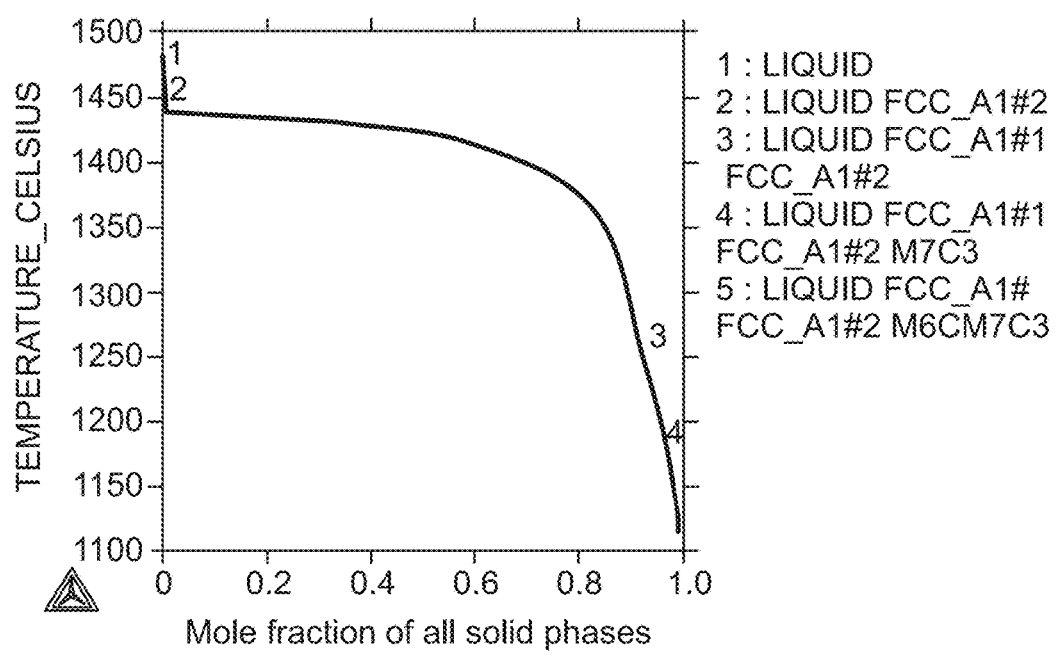
FIG. 2 presents a graph of the development of the fractions of phases as a function of the temperature during the solidification of a molten tool steel for piston rings according to the present invention.

FIG. 2, obtained using the ThermoCalc thermodynamic modeling software, presents the sequence of solidification of a tool steel according to the present invention. It may be observed that it is practically eutectic, the liquid phase decomposing quasi totally into the eutectic austenite+NbC and, in insignificant fractions, into the eutectics austenite+$M_7C_3$ and austenite+$M_2C$. Consequently, for an alloy having 3% by weight of niobium, 0.39% by weight of C is consumed in the formation of 3% by volume of NbC, corresponding to the stoichiometric combination of 0.13% C for each 1% Nb by weight. The remaining quantity of carbon and practically the entire content of each of the other elements will be dissolved in the austenite and will participate in the reactions of the decomposition thereof during the cooling following solidification and following the cycles of the heat treatments of quenching and tempering.

In the present invention, the piston rings may be obtained commencing from semifinished products cast by different casting processes, preferentially casting in molds of green sand or sand-resin, casting in ceramic molds and centrifugal casting, submitted to subsequent machining operations.

The raw materials utilized in the process of casting the semifinished product may be scrap of low alloy steels, recycled production, and ferroalloys, not being limited to these materials. The melting of the material for preparation of the alloy may be realized in induction furnaces, but is not limited to this type of equipment. The furnace utilized for preparation and melting of the alloy may have atmosphere and pressure control, the control of these variables not being, nevertheless, strictly necessary. The pouring of the alloy into the molds must be realized at temperatures of between 1500° C. and 1650° C.

Subsequent to cooling in the molds, the system of casting channels, should it exist, is removed, permitting the separation of the parts (rings or tubes). The rings or tubes are annealed at temperatures of between 600° C. and 800° C., having the objective of homogenizing the microstructure of the material and facilitating the stages of cutting and machining, should they be utilized.

Subsequent to annealing, the parts pass through heat treatments of quenching and tempering, having the objective of obtaining a matrix of tempered martensite having secondary carbides of the $M_2C$ and/or MC type and a hardness of between 400 HV and 800 HV. The heat treatments consist of heating the parts at temperatures of between 900° C. and 1150° C. (austenitization) and quenching in air (forced or still) or in oil. These heat treatments are preferentially realized in furnaces having a controlled atmosphere to prevent changes in composition of the surfaces and excessive oxidation of the parts. Subsequent to the heat treatment of quenching the parts may pass through a stage of tempering at temperatures of up to 650° C., with a view to rendering the hardness appropriate for the desired application.

Table 1 shows the limits of the contents of the principal alloying elements constituting the cast tool steel for piston rings according to the present invention.

TABLE 1

Limits of composition of the tool steel

| Element | Concentration (% weight) | |
|---|---|---|
| | min. | max. |
| C | 0.80 | 1.40 |
| Cr | 2.50 | 4.20 |
| Fe | Balance | Balance |
| Mn | 0.10 | 1.00 |
| Mo | 1.00 | 2.00 |
| Nb | 2.50 | 4.50 |
| P | — | 0.05 |
| S | — | 0.05 |

TABLE 1-continued

Limits of composition of the tool steel

| Element | Concentration (% weight) | |
|---|---|---|
| | min. | max. |
| Si | 0.10 | 1.00 |
| Ti | 0.10 | 0.30 |
| V | 1.00 | 3.00 |
| W | 1.00 | 3.00 |

The carbon and the niobium participate in the formation of the NbC eutectic carbides during the solidification of the tool steel. The carbon also participates in the precipitation of secondary carbides of the $M_2C$ and/or MC type during the cooling following the solidification or during the treatment of tempering and of the hardening of the martensite of the matrix. The minimum content of carbon ensures the formation of the NbC eutectic carbides and, at the same time, the high hardness of the martensitic matrix. The limitation of the carbon content to the maximum shown in Table 1 prevents the martensitic matrix having low toughness and also prevents the tool steel from becoming excessively hypereutectic, with the formation of primary NbC carbides of large dimensions and dendritic morphology, prejudicing the fatigue resistance. The minimum content of niobium ensures the formation of the minimum volumetric fraction of NbC for the obtainment of high hardness and wear resistance. The limitation on the content of niobium prevents the tool steel becoming excessively hypereutectic.

The chromium leads to high quenchability at low cost. The upper limit ensures the formation of an insignificant fraction of $M_7C_3$ eutectic carbides at the conclusion of the solidification, preventing the precipitation thereof in a continuous manner in interdendritic regions.

The elements vanadium, molybdenum and tungsten are those principally responsible for the precipitation of secondary $M_2C$ and/or MC carbides during the tempering cycles, ensuring the secondary hardening of the matrix. The upper limits ensure the formation of an insignificant fraction of $M_2C$ eutectic carbides at the conclusion of the solidification, preventing their precipitation in a continuous manner in interdendritic regions.

The titanium is responsible for the formation, at temperatures exceeding liquidus, of particles of Ti(C,N) carbonitrides then acting as effective nucleators of the NbC eutectic carbides and, consequently, promoting the precipitation of these carbides in the form of isolated and homogeneously distributed cubic particles. The lower limit ensures the function of nucleator, whilst the upper limit prevents the excessive formation of titanium oxide, prejudicial to the fatigue resistance.

The silicon acts as deoxidant in the process of casting the tool steel. The lower limit ensures the deoxidant function thereof, whilst the upper limit prevents it acting as an embrittler.

The manganese acts as deoxidant in the process of casting the tool steel and as neutralizer of the sulphur, forming MnS. The lower limit ensures the deoxidant function thereof, whilst the upper limit prevents the excessive depression of the temperature of initiation of the formation of martensite.

The phosphorus and the sulphur are impurities of the tool steel having an embrittlement effect and, consequently, the contents thereof must be the lowest possible. The upper limit of 0.05% ensures that this effect is not manifested and permits the employment of raw materials of commercial purity in the casting of the tool steel.

A charge containing low alloy steel, recycled production and ferroalloys was melted in an induction furnace, without a chamber for pressure control, having the objective of obtaining the tool steel for piston rings according to the present invention. To prevent the excessive oxidation of the molten metal injection of argon onto the surface of the bath was utilized. Subsequent to the complete melting of the charge and temperature control, the molten metal was poured at 1580° C. into a mold of sand-resin. During the pouring samples were taken for chemical composition analysis, the result whereof is shown in Table 2.

TABLE 2

Chemical composition measured on sample obtained in the example of embodiment

| Element | Concentration (% weight) |
|---|---|
| C | 1.01 |
| Cr | 3.20 |
| Fe | Balance |
| Mn | 0.82 |
| Mo | 1.74 |
| Nb | 3.20 |
| P | <0.03 |
| S | 0.018 |
| Si | 0.71 |
| Ti | 0.15 |
| V | 1.25 |
| W | 1.14 |

A tube was cast having internal and external diameters of dimensions proximate to those of a piston ring. Following cooling, the tube was cleaned and submitted to annealing heat treatment (750° C.—4 hours and cooling in the furnace). Subsequently, the annealed tube was submitted to machine trimming and cutting into rings, the rings then being submitted to heat treatments of quenching (1050° C.—2 hours and cooling in still air) and of double tempering (500° C.—2 hours and cooling in still air).

Figure 3:
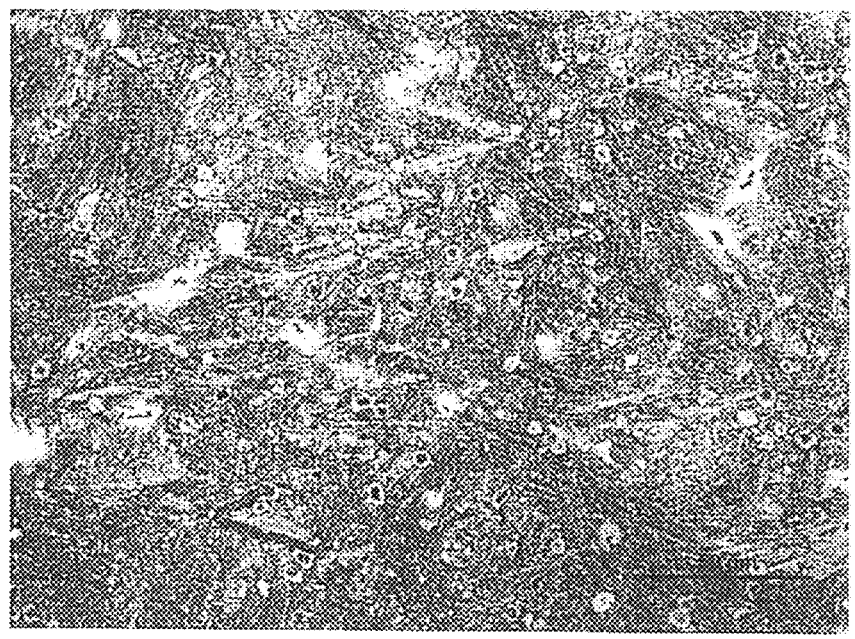
FIG. 3 shows the microstructure of the material obtained in the example of embodiment of the present invention in the state as-cast.
Figure 4:
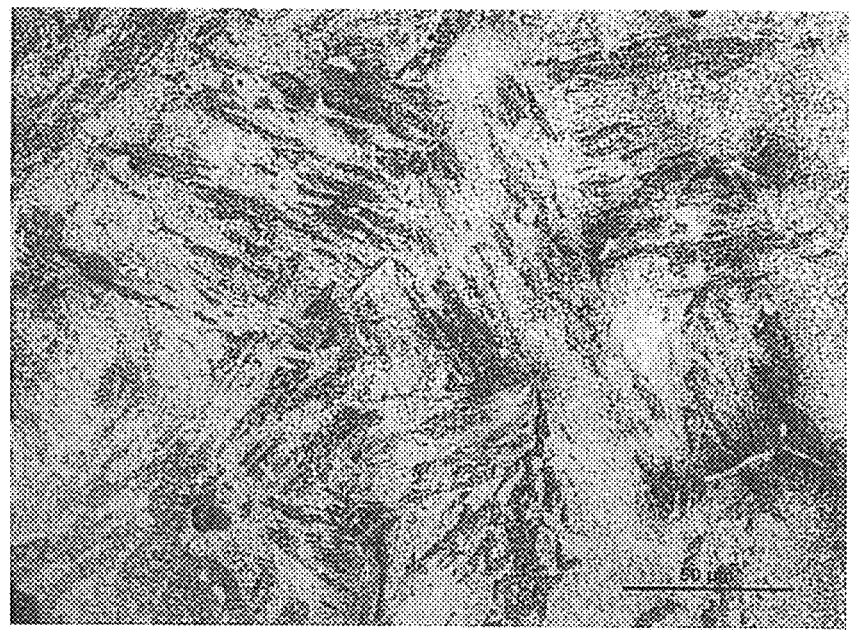
FIG. 4 shows the microstructure of the material obtained in the example of embodiment of the present invention following annealing (750° C. for 4 hours and cooling in the furnace).
Figure 5:
FIG. 5 shows the microstructure of the material obtained in the example of embodiment of the present invention following quenching (1050° C. for 2 hours and cooling in still air).
Figure 6:
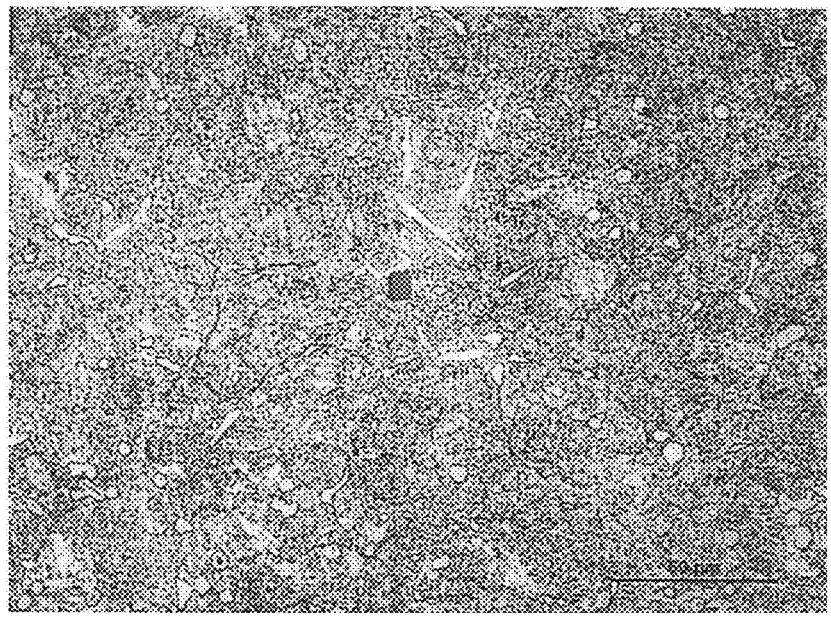
FIG. 6 shows the microstructure of the material obtained in the example of embodiment of the present invention following tempering (500° C. 4 hours and cooling in still air).

FIG. 3 shows the microstructure of the material obtained in the as-cast state wherein the NbC eutectic carbides are identified. FIGS. 4, 5 and 6 show the microstructure of the material following the heat treatments of annealing, quenching and tempering, respectively.

Figure 7:
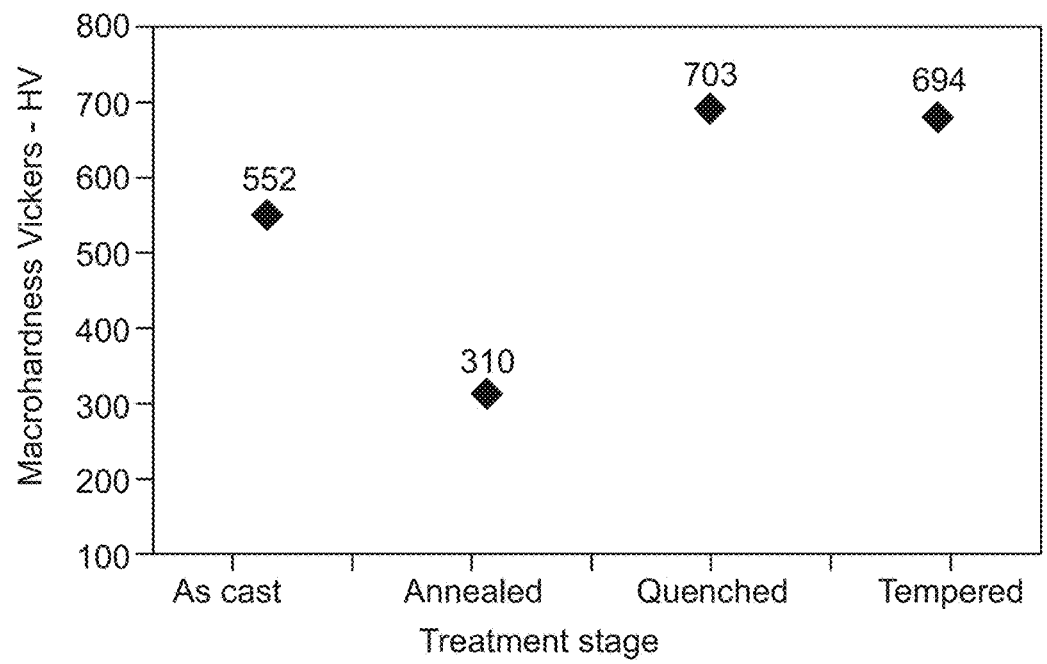
FIG. 7 presents a graph of the development of the hardness of the material obtained in the example of embodiment of the present invention in the different stages of the process of manufacture.

FIG. 7 shows the development of the hardness of the material obtained in the example of embodiment of the present invention at each stage of the process of manufacture. Following the tempering, the hardness value is of 694 HV, being substantially greater than the hardness values typical of the cast irons and stainless steels commonly utilized in the manufacture of piston rings. This result of greater hardness of the material of the present invention is due to the chemical composition thereof and to the cycles of heat treatment realized in the production process.

The hardness values subsequent to each heat treatment and the presence of NbC eutectic carbides in the microstructure imply the possibility of utilization of the rings produced according to the present invention, without the necessity of the stage of treatment of surfaces (nitridation and ceramic coatings) normally utilized on the materials used in the state of the art on piston rings.

Figure 8:
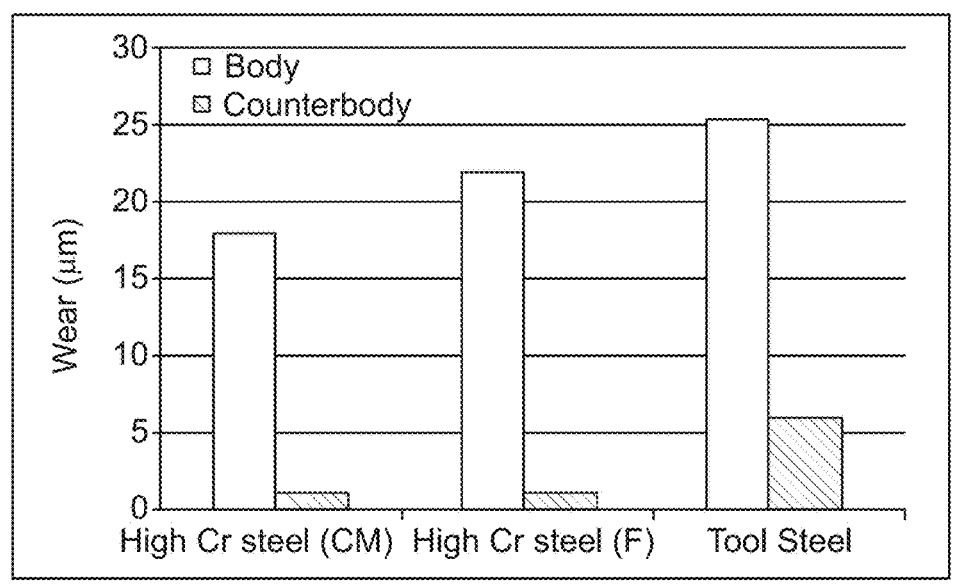
FIG. 8 presents a graph of the results of tests of sliding wear of the material obtained in the example of embodiment of the present invention in the states as-cast and heat treated (without surface treatment), comparing them with results of mechanically shaped and nitrided high chromium steel (CM) and of cast and nitrided high chromium steel (F).

FIG. 8 shows results of sliding wear tests of the material obtained in the example of embodiment of the present invention in the cast and heat treated (without surface treatment) states, comparing them with results of mechanically shaped and nitrided high chromium steel (CM) and of cast and nitrided high chromium steel (F). The tests were executed on a universal tribometer employing a counterbody of pearlitic grey cast iron, and the figure shows the measured values of wear of the body (material of the ring) and of the counterbody (material of the liner).

It is observed that the tool steel does not require the nitridation treatment to achieve rates of wear of the same order as those obtained with the other nitrided materials.

The invention claimed is:
1. A piston ring in cast tool steels, comprising:
   a ring including of a tempered material having a chemical composition including:
      a concentration of C from 0.80 to 1.40 percent weight;
      a concentration of Cr from 2.50 to 4.20 percent weight;
      a concentration of Mn from 0.10 to 1.00 percent weight;
      a concentration of Mo from 1.00 to 2.00 percent weight;
      a concentration of Nb from 2.50 to 4.50 percent weight;
      a concentration of P of no more than 0.05 percent weight;
      a concentration of S of no more than 0.05 percent weight;
      a concentration of Si from 0.10 to 1.00 percent weight;
      a concentration of Ti from 0.10 to 0.30 percent weight;
      a concentration of V from 1.00 to 3.00 percent weight;
      a concentration of W from 1.00 to 3.00 percent weight; and
      a remaining concentration balance of Fe;
   a microstructure of the tempered material configured as 1) a matrix of tempered martensite with a toughness improving precipitation of at least one of secondary $M_2C$ carbides and MC carbides having a size of approximately 3 µm or less, and 2) NbC eutectic carbides having a cubic morphology, a volumetric fraction from approximately 1% to 4%, a size from approximately 3 µm to 7 µm, and a homogeneous distribution;
   wherein M is at least one of V, Mo, Cr, and W; and
   wherein the tempered material has a hardness from approximately 400 HV to 800 HV.
2. The piston ring as claimed in claim 1, wherein the ring is a gravity casted ring.
3. The piston ring as claimed in claim 1, wherein the ring is a centrifugal casted ring.
4. The piston ring as claimed in claim 1, wherein the ring is produced utilizing at least one of molds of green sand, molds of sand-resin, and ceramic molds.
5. The piston ring as claimed in claim 1, wherein the ring is produced via a process including:
   annealing the ring at a temperature from 600° C. to 800° C.;
   heat treating the ring via quenching at a temperature from 900° C. to 1150° C.; and
   tempering the ring at a temperature of 650° C. or less.
6. The piston ring as claimed in claim 5, wherein the ring is quenched in a furnace having a controlled atmosphere.
7. The piston ring as claimed in claim 5, wherein the ring includes a contact face configured to contact a piston cylinder, wherein the contact face includes an antiwear coating disposed thereon via at least one of a galvanic process, spraying, and physical vapor deposition.
8. The piston ring as claimed in claim 1, wherein the ring includes at least one surface including at least one of a nitridation and an antiwear coating.
9. The piston ring as claimed in claim 8, wherein the nitridation is provided via at least one of a gas, a plasma, and a salt bath.
10. The piston ring as claimed in claim 1, wherein the ring includes a contact face configured to contact a piston cylinder, wherein the contact face includes an antiwear coating disposed thereon via at least one of a galvanic process, spraying, and physical vapor deposition.
11. A piston ring in cast tool steels, comprising:
   a tempered ring including a contact face configured to contact a piston cylinder, the ring having a chemical composition including:
      a concentration of C from 0.80 to 1.40 percent weight;
      a concentration of Cr from 2.50 to 4.20 percent weight;
      a concentration of Mn from 0.10 to 1.00 percent weight;
      a concentration of Mo from 1.00 to 2.00 percent weight;
      a concentration of Nb from 2.50 to 4.50 percent weight;
      a concentration of P of no more than 0.05 percent weight;
      a concentration of S of no more than 0.05 percent weight;
      a concentration of Si from 0.10 to 1.00 percent weight;
      a concentration of Ti from 0.10 to 0.30 percent weight;
      a concentration of V from 1.00 to 3.00 percent weight;
      a concentration of W from 1.00 to 3.00 percent weight; and
      a remaining concentration balance of Fe;
   wherein the ring has a microstructure including 1) a matrix of tempered martensite with precipitation of at least one of $V_2C$ carbides, VC carbides, $Mo_2C$ carbides, MoC carbides, $Cr_2C$ carbides, CrC carbides, $W_2C$ carbides, and WC carbides having a size of approximately 3 µm or less, and 2) NbC eutectic carbides having a cubic morphology, a volumetric fraction from approximately 1% to 4%, a size from approximately 3 µm to 7 82 m, and a homogeneous distribution, and wherein the ring has a hardness from approximately 400 HV to 800 HV.
12. The piston ring as claimed in claim 11, wherein the ring is annealed at a temperature from approximately 600° C. to 800° C., quenched at a temperature from approximately 900° C. to 1150° C., and tempered at a temperature of approximately 650° C. or less.
13. The piston ring as claimed in claim 11, wherein the ring includes at least one surface including at least one of a nitridation and an antiwear coating.
14. The piston ring as claimed in claim 13, wherein the nitridation is provided via at least one of a gas, a plasma, and a salt bath.
15. The piston ring as claimed in claim 13, wherein the contact face includes the antiwear coating, and wherein the antiwear coating is disposed via at least one of a galvanic process, spraying, and physical vapor deposition.
16. The piston ring as claimed in claim 11, wherein the ring is one of a gravity casted ring and a centrifugal casted ring.
17. A piston ring in cast tool steels, comprising:
   a tempered ring structured of a material having a chemical composition including:
      a concentration of C from 0.80 to 1.40 percent weight;
      a concentration of Cr from 2.50 to 4.20 percent weight;
      a concentration of Mn from 0.10 to 1.00 percent weight;
      a concentration of Mo from 1.00 to 2.00 percent weight;

a concentration of Nb from 2.50 to 4.50 percent weight;
a concentration of P of no more than 0.05 percent weight;
a concentration of S of no more than 0.05 percent weight;
a concentration of Si from 0.10 to 1.00 percent weight;
a concentration of Ti from 0.10 to 0.30 percent weight;
a concentration of V from 1.00 to 3.00 percent weight;
a concentration of W from 1.00 to 3.00 percent weight; and
a remaining concentration balance of Fe;

wherein the ring has a microstructure including 1) a matrix of tempered martensite with precipitation of at least one of $V_2C$ carbides, VC carbides, $Mo_2C$ carbides, MoC carbides, $Cr_2C$ carbides, CrC carbides, $W_2C$ carbides, and WC carbides having a size of approximately 3 μm or less, and 2) NbC eutectic carbides having a cubic morphology, a volumetric fraction from approximately 1% to 4%, a size from approximately 3 μm to 7 μm, and a homogeneous distribution, and wherein the ring has a hardness from approximately 400 HV to 800 HV and includes at least one surface including a nitridation.

18. The piston ring as claimed in claim 17, wherein the nitridation is provided via at least one of a gas, a plasma, and a salt bath.

19. The piston ring as claimed in claim 17, wherein the ring is one of a gravity casted ring and a centrifugal casted ring.

20. The piston ring as claimed in claim 17, wherein the ring is annealed at a temperature from approximately 600° C. to 800° C., quenched at a temperature from approximately 900° C. to 1150° C., and tempered at a temperature of approximately 650° C. or less.

\* \* \* \* \*